United States Patent [19]

Perles

[11] 4,109,770
[45] Aug. 29, 1978

[54] CLUTCH DEVICES
[75] Inventor: René Perles, Rillieux-la-Pape, France
[73] Assignee: Verdol S.A., Caluire, France
[21] Appl. No.: 778,524
[22] Filed: Mar. 17, 1977
[30] Foreign Application Priority Data
Mar. 19, 1976 [FR] France .................. 76 08614
[51] Int. Cl.² ............................................ B60K 41/24
[52] U.S. Cl. .................. 192/12 BA; 192/35; 192/415
[58] Field of Search ............... 192/12 BA, 17 D, 35, 192/36, 415

[56] References Cited
U.S. PATENT DOCUMENTS

| | | | |
|---|---|---|---|
| 2,523,772 | 9/1950 | McGibbon et al. | 192/35 |
| 3,021,512 | 2/1962 | Welsh et al. | 192/12 BA |
| 3,412,617 | 11/1968 | Holzer | 192/41 S X |

*Primary Examiner*—Roy Lake
*Assistant Examiner*—DeWalden W. Jones
*Attorney, Agent, or Firm*—Dowell & Dowell

[57] ABSTRACT

A clutch device interposed between a driving shaft 1 and a drum 2-4 rotatably mounted thereon to drive frictionally a yarn winding bobbin in a spinning, twisting or doubling frame comprises a cylindrical sleeve 5 carried by shaft 1, a string 6 wound on sleeve 5 and having one end attached to the hub 2 of drum 2-4, a plate 9 slidable on shaft 1 and to which the other end of string 6 is attached, a frictional abutment ring 11 secured to shaft 1, a spring 10 to apply plate 9 against ring 11, and a pusher 14 by means of which plate 14 may be moved apart from abutment 11 to de-clutch drum 2-4 from shaft 1. A frictional lining 13 is disposed on ring 11 to enhance its driving effect on plate 9 to more tightly wind string 6 on sleeve 5. Another frictional lining is provided on pusher 11 to act on plate 9 when the latter is disengaged from ring 11. A ring 16 mounted in the open end of drum 2-4 and equipped with a frictional lining 17 cooperates with the free edge of the cylindrical extension 9a of plate 9 to brake the drum at the end of the de-clutching stroke of pusher 14. In a modification string 6 is replaced by a solenoid of plastic material surrounded by an expansion limiting sleeve and a torque limiting system is interposed between the end of this solenoid and the drum.

9 Claims, 3 Drawing Figures

CLUTCH DEVICES

This invention relates to clutch devices in general and more particularly to those used in spinning, twisting or doubling frames to connect with their common shaft the individual drums or rolls which drive frictionally the yarn winding bobbins.

Such a clutch may comprise an elongated deformable member disposed around a cylindrical portion of the first one of the two co-axially rotatable parts to be connected with each other, a first end of this member being attached to the second one of these parts, while means are provided to act on the second end of the said elongated member in order to cause it to become tightly wound on the cylindrical portion, or on the contrary to liberate it therefrom. The deformable elongated member is generally in the form of a spiral spring having at rest an inner diameter somewhat larger than the outer diameter of the cylindrical portion.

It is an object of the invention to provide a clutch device of this kind under a simplified and inexpensive form.

According to the present invention the second end of the elongated deformable member is attached to an intermediate member resiliently applied against a frictional abutment which rotates with the cylindrical portion, means being provided to push axially the said intermediate member so as to disengage it from the frictional abutment to de-clutch the device.

The elongated deformable member may be formed of a string or cable, or else by a solenoid made of plastic material.

The device preferably comprises a second or auxiliary frictional abutment carried by the second one of the parts to be connected, frictional means being inserted between the pusher means, which are retained against rotation, and the intermediate member in such manner that at the end of its de-clutching stroke the said intermediate member may be applied against this second rotatable part is then efficiently braked.

A torque limiting system may be inserted between the first end of the elongated deformable member and the second rotatable part of the clutch device.

Figure 1:
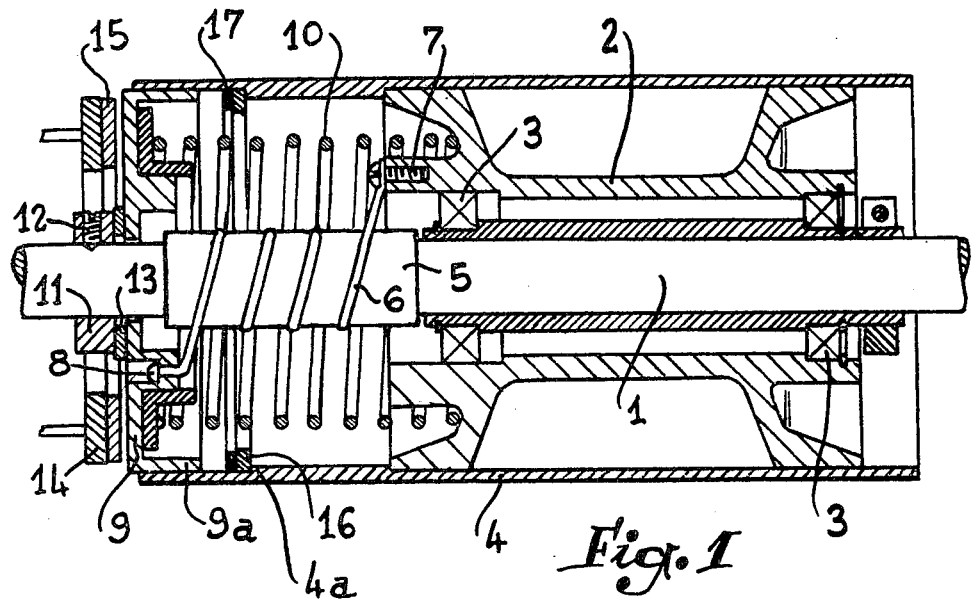
FIG. 1 is a longitudinal section of an individual driving drum adapted to drive a winding bobbin in a spinning, twisting or doubling frame, the clutch device associated with this drum being illustrated at the clutched position.

In FIG. 1 reference numeral 1 designates the conventional common shaft on which are mounted the individual drums adapted to drive frictionally the yarn winding bobbins (not shown) of the successive stations of a spinning, twisting or doubling frame otherwise not illustrated. Each drum comprises a hub 2 rotatably mounted on shaft 1 by means of antifriction bearings 3, and a tubular rim 4 secured to this hub, as for instance by force fit. This rim 4 extends substantially beyond hub 2 on the left-hand side of the figure to define with shaft 1 an open or annular chamber adapted to house the clutch device which connects the drum with the shaft.

This device comprises a cylindrical sleeve 5 secured onto shaft 1 by any appropriate means, as for instance by set screws not shown, and a string 6 wound theron. A first end of this string 6 is attached to hub 2 as for instance by means of a screw 7, while the second end is fixed at 8 to a circular plate 9 having a cylindrical peripheral extension 9a which is in slidable contact with the inner wall of rim 4. A spring 10 is interposed between hub 2 and plate 9 to urge the latter against an abutment ring 11 keyed on shaft 1 by means of a set screw 12, the side of this ring which faces plate 9 carrying a frictional lining 13.

There is further provided a annular pusher 14 coaxial to shaft 1 and also equipped with a frictional lining 15 on its side facing plate 9 to push the latter into the tubular rim 4. This axially displaceable pusher 14 is appropriately retained against rotation, as for instance by means of longitudinal rods fixed thereto and which slide in stationary guides, not shown.

In normal operation, that is when the drum should frictionally drive the winding bobbin (not shown) with which it is associated and which is pressed against rim 4 by gravity or by spring means, as this is conventional in such machines, pusher 14 is at its ineffective position illustrated in FIG. 1 and at which it is spaced from the outer side of plate 9. The latter is therefore applied against ring 11 under the action of spring 10 and it is thus frictionally driven by the said ring and consequently by shaft 1. Assuming shaft 1 rotates clockwise for an observer situated on the left-hand side of the drawing, it is easy to see that the torque developped by the said shaft tends to wind more closely string 6 on sleeve 5. The frictional torque transmitted from ring 11 to plate 9 is admittedly quite limited, but it is multiplied by the winding effect of string 6 the first end (screw 7) of which thus applies a much higher torque to hub 2, sleeve 5 thus acting more or less as a winch.

Figure 2:
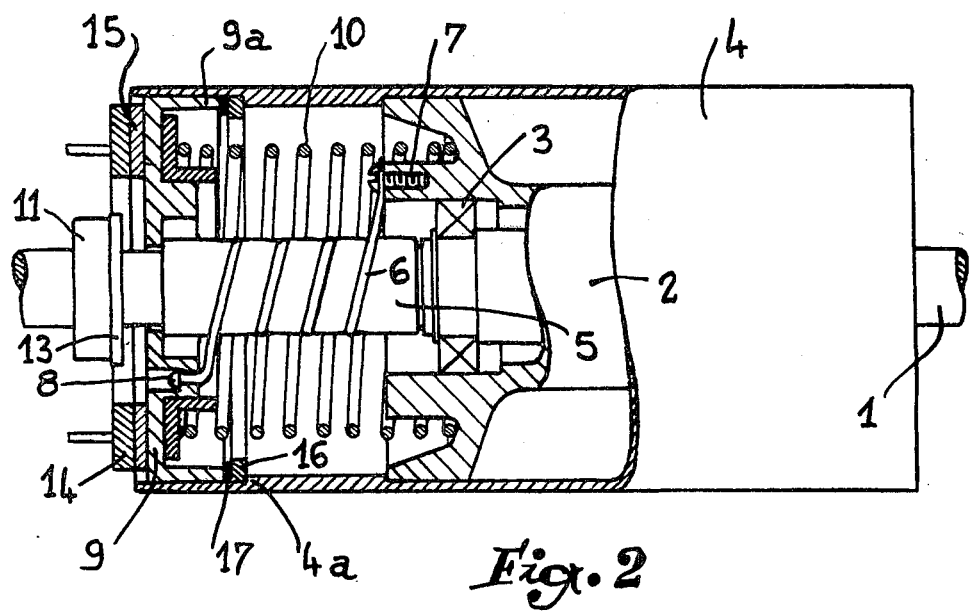
FIG. 2 is a fragmental longitudinal section showing the device at the de-clutched position.

When drum 2–4 is to be de-clutched from shaft 1, pusher 14 is displaced towards the right against spring 10 in such manner as to engage plate 9, to push it axially and to apply the free edge of its cylindrical extension 9a against a ring 16 mounted as a force fit within rim 4 to rest against a shoulder 4a provided in the inner wall of the latter, the said ring being preferably provided with a frictional lining 17, as clearly shown in FIG. 2. This displacement of plate 9 has two results:

One°–Plate 9 is no more driven by abutment ring 11 and is on the contrary braked by the frictional lining 15 of pusher 14 which, as aforesaid, is prevented from rotating. Plate 9 is thus almost immediately brought to a standstill practically before the free edge of its cylindrical extension 9a engages the frictional lining 17 of ring 16. String 6 therefore becomes loose on sleeve 5 and drum 2–4 is de-clutched from shaft 1.

Two°–When the edge of the cylindrical extension 9a of plate 9 engages lining 17, its exerts a braking action on drum 2–4 and absorbs very rapidly the kinetic energy of the said drum and of the bobbin associated therewith.

When the drum is to be re-clutched, pusher 14 is displaced towards the left to be returned to the position of FIG. 1. Plate 9 is again driven by abutment ring 11, string 6 is re-wound on sleeve 5 and drum 2–4 is again driven by shaft 1.

In actual practice drum 2–4 is quite rapidly stopped and re-clutched, which is an important factor in spinning, twisting and doubling frames.

Sleeve 5 could be formed with a spiral groove to receive string 6 and to guide its successive turns. It is also obvious that two or more strings could be used, if desired.

Figure 3:
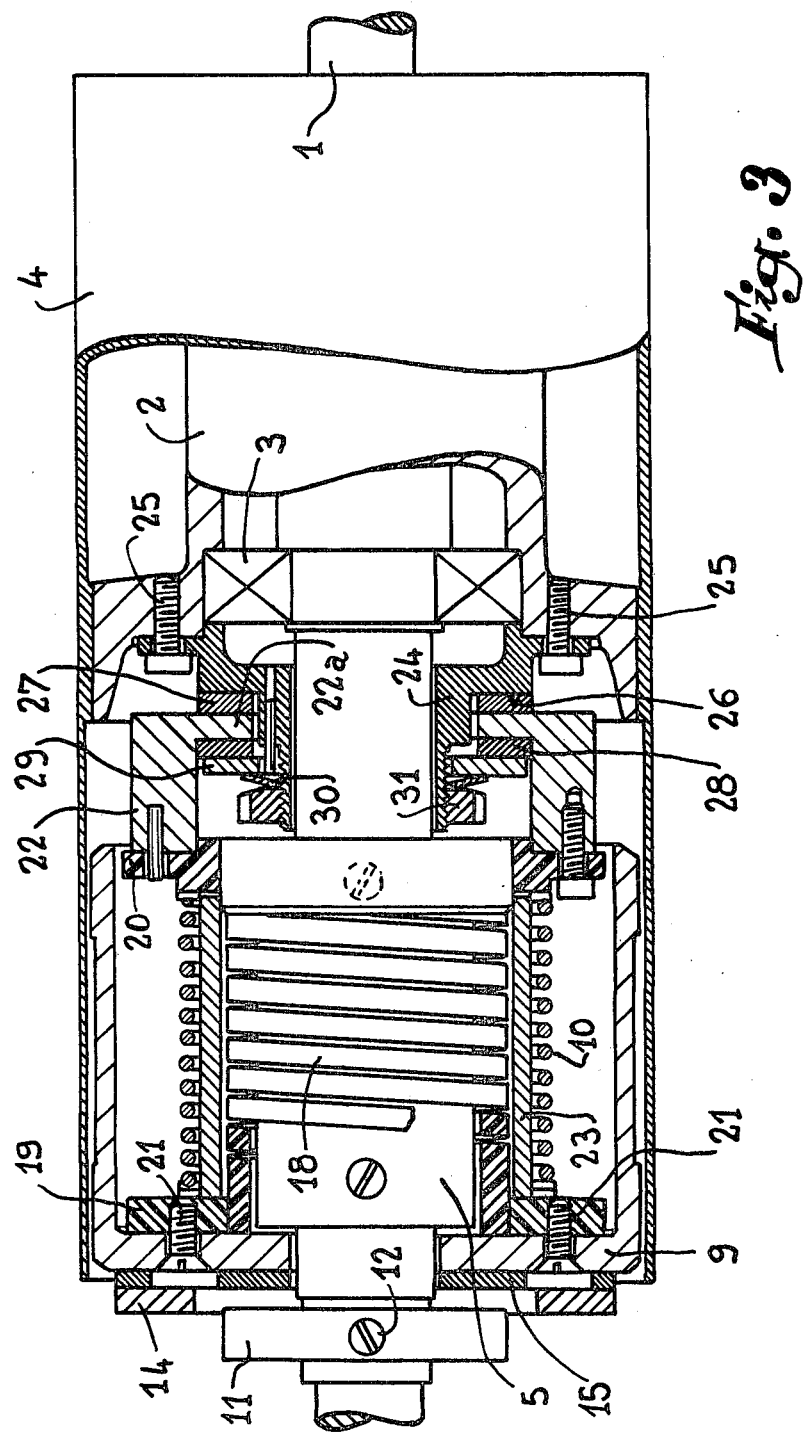
FIG. 3 is a fragmental section of a modified embodiment illustrated at the de-clutched position.

In the modified embodiment of FIG. 3, the elongated deformable member is in the form of a solenoid 18 made of plastic material, the ends of which are secured in any appropriate manner to annular flanges, respectively 19 and 20. Flange 19 is fixed to plate 9 by means of screws 21, while flange 20 is fixed to a bell-shaped member 22 having an inwardly directed extension 22a. Spring 10 is interposed between flanges 19 and 20 and its compression stroke is limited by a sleeve 23 disposed between the said spring and solenoid 18.

A cup-shaped member 24 is fixed to hub 2 by means of screws 25. This cup has a flat annular surface 26 which faces the inward extension 22a of member 22 and which carries a frictional lining 27. Extension 22a is clamped between this lining 27 and another frictional lining 28 carried by an annular disc 29 which receives the action of a spring washer 30, the latter taking rest against a nut 31 adjustably screwed on a tubular extension of cup 24.

It will be understood that extension 22a and linings 27, 28 form a torque limiting system. When therefore pusher 14 is moved towards the left to clutch drum 2-4 with shaft 1, lining 15 engages abutment ring 11 and plate 9 is driven by shaft 1, thus causing solenoid 18 to become tightly wound on sleeve 5, but drum 2-4 cannot be too rapidly accelerated, since slipping may take place between extension 22a and linings 27, 28. The torque applied to the drum is thus limited and any breakage of solenoid 18 is avoided while at the same time the bobbin with which the drum is associated is not submitted to a too strong starting shock.

It will be noted that the embodiment of FIG. 3 comprises no braking lining. When therefore pusher 14 acts on plate 9 (position illustrated in FIG. 3), sleeve 23 only exerts a quite moderate braking effect. But this action is sufficient to cause expansion of solenoid 18 which then engages sleeve 23, thus considerably increasing the braking action.

It is obvious that the torque limiting system of FIG. 3 could also be used in the embodiment of FIGS. 1 and 2.

I claim:

1. A clutch device to connect a first and a second co-axially rotatable parts, more particularly for the actuation of the drums which drive frictionally the winding bobbins in spinning, twisting and doubling frames, of the kind comprising:

a substantially cylindrical portion co-axial to said first rotatable part and angularly connected therewith;
 an elongated deformable member wound on said cylindrical portion, said elongated member having a first and a second ends, with said first end being attached to said second rotatable part;
 and means to act on the second end of said elongated member to cause same either to wind tightly on said cylindrical portion or to become loose thereon; the improvement which consists in said means comprising:
 an intermediate member to which the second end of said elongated member is attached, said intermediate member being co-axial to said first and second rotatable parts, and freely rotatable and longitudinally displaceable with respect to same;
 a main frictional abutment co-axial to said first rotatable part and angularly and longitudinally connected therewith;
 spring means to resilient press said intermediate member against said main frictional abutment to cause said intermediate member to be frictionally driven by said first rotatable part and to tightly wind seid elongated member on said cylindrical portion to clutch said second rotatable part with said first rotatable part;
 and pusher means to displace longitudinally said intermediate member to disengage same from said main frictional abutment to release said elongated member and to de-clutch said second rotatable part from said first rotatable part.

2. In a clutch device as claimed in claim 1, said elongated deformable member being formed of a string.

3. In a clutch device as claimed in claim 1, said elongated deformable member being formed of a solenoid of plastic material.

4. In a clutch device as claimed in claim 3, a sleeve surrounding said solenoid to limit the expansion thereof during de-clutching.

5. In a clutch device as claimed in claim 1, said first rotatable part being formed of a shaft on which said cylindrical portion is fixed, and said second rotatable part being formed of a drum loosely mounted on said shaft.

6. In a clutch device as claimed in claim 5, said drum having an open end and said intermediate member being formed of a plate slidably mounted on said shaft, said plate having a cylindrical peripheral extension slidable in the open end of said drum.

7. In a clutch device as claimed in claim 6, said cylindrical extension having a free edge, said pusher means being retained against rotation and said device further comprising an auxiliary braking frictional abutment annularly disposed in the open end of said drum to cooperate with the free edge of said cylindrical extension when said plate is pushed by said pusher means and displaced by same apart from said main frictional abutment.

8. In a clutch device as claimed in claim 5, a torque limiting system interposed between the first end of said elongated member and said drum.

9. In a clutch device as claimed in claim 1, an auxiliary braking frictional abutment fixed to said second rotatable part to be engaged by said intermediate member when same if displaced by said pusher means apart from said main abutment.

* * * * *